(12) United States Patent
Holl

(10) Patent No.: US 6,723,999 B2
(45) Date of Patent: Apr. 20, 2004

(54) ELECTROMAGNETIC WAVE ASSISTED CHEMICAL PROCESSING

(75) Inventor: Richard A. Holl, Camarillo, CA (US)

(73) Assignee: Holl Technologies Company, Camarillo, CA (US)

( * ) Notice: Subject to any disclaimer, the term of this patent is extended or adjusted under 35 U.S.C. 154(b) by 3 days.

(21) Appl. No.: 09/853,448

(22) Filed: May 10, 2001

(65) Prior Publication Data

US 2001/0030295 A1 Oct. 18, 2001

Related U.S. Application Data

(63) Continuation-in-part of application No. 09/345,813, filed on Jul. 2, 1999, and a continuation-in-part of application No. 09/802,037, filed on Mar. 7, 2001.
(60) Provisional application No. 60/214,538, filed on Jun. 27, 2000, and provisional application No. 60/202,906, filed on May 10, 2000.

(51) Int. Cl.$^7$ .................. G01N 21/01; G01N 21/51; G01N 23/12
(52) U.S. Cl. .................. 250/438; 210/748; 366/279
(58) Field of Search .................. 250/438; 210/748, 210/85; 422/22; 165/109.1; 366/69, 279; 435/99; 494/27

(56) References Cited

U.S. PATENT DOCUMENTS

| | | | |
|---|---|---|---|
| 2,295,740 A | 9/1942 | Keen | |
| 3,595,531 A | 7/1971 | Williams et al. | |
| 4,311,570 A | 1/1982 | Cowen et al. | 204/157.1 |
| 4,744,521 A | 5/1988 | Singer et al. | 241/66 |
| 4,769,131 A * | 9/1988 | Noll et al. | 210/85 |
| 4,784,218 A * | 11/1988 | Holl | 165/109.1 |
| 4,921,473 A * | 5/1990 | Lee et al. | 494/27 |
| 4,983,307 A * | 1/1991 | Nesathurai | 210/748 |
| 5,227,637 A * | 7/1993 | Herold et al. | 250/438 |
| 5,300,019 A | 4/1994 | Bischof et al. | |
| 5,370,824 A | 12/1994 | Nagano et al. | |
| 5,370,999 A * | 12/1994 | Stuart | 435/99 |
| 5,471,037 A | 11/1995 | Goethel et al. | 219/750 |
| 5,554,323 A | 9/1996 | Tsukimi et al. | |
| 5,558,820 A | 9/1996 | Nagano et al. | |
| 5,674,004 A * | 10/1997 | Takeuchi | 366/69 |
| 6,464,936 B1 * | 10/2002 | Mowat et al. | 422/22 |

OTHER PUBLICATIONS

Van Der Hoeven, Examiner Maria; PCT International Search Report from application PCT/US01/15258; Jan. 2, 2002.
Soohoo, Examiner Tony; PCT International Search Report from application PCT/US02/05361; Jun. 5, 2002.

* cited by examiner

*Primary Examiner*—John R. Lee
*Assistant Examiner*—Paul M. Gurzo
(74) *Attorney, Agent, or Firm*—Greenberg Traurig, LLP; Christopher Darrow, Esq.

(57) ABSTRACT

A window allows the introduction of radiation energy into an annular processing chamber filled with a material to be processed. The chamber is formed from coaxial cylinder members rapidly rotating relative to one another. The chamber can be thin enough so that it is short compared to the penetration depth of the radiation through the material, providing even exposure of the material to the radiation. Also, eddies created in the material by the relative rotation enhances the even exposure. When the material inside the annular processing chamber is opaque, resulting in an insignificant penetration depth, the eddies still insure that the material is evenly exposed to the irradiation.

37 Claims, 3 Drawing Sheets

ELECTROMAGNETIC WAVE ASSISTED CHEMICAL PROCESSING

This application claims priority from U.S. Provisional Applications Serial Nos. 60/202,906 and 60/214,538 filed May 10, 2000 and Jun. 27, 2000, respectively, and is a CIP of U.S. application Ser. Nos. 09/345,813 and 09/802,037, filed Jul. 2, 1999 and Mar. 7, 2001, respectively.

BACKGROUND OF THE INVENTION

1. Field of the Invention

The present invention relates to materials processing involving a chemical and/or a physical action(s) or reaction(s) of a component or between components. More specifically, the present invention uses irradiation of components in a reactor to continuously process relatively large quantities of materials.

2. General Background and State of the Art

Apparatus for materials processing consisting of coaxial cylinders that are rotated relative to one another about a common axis, the materials to be processed being fed into the annular space between the cylinders, are known. For example, U.S. Pat. No. 5,370,999, issued Dec. 6, 1994 to Colorado State University Research Foundation discloses processes for the high shear processing of a fibrous biomass by injecting a slurry thereof into a turbulent Couette flow created in a "high-frequency rotor-stator device", this device having an annular chamber containing a fixed stator equipped with a coaxial toothed ring cooperating with an opposed coaxial toothed ring coupled to the rotor. U.S. Pat. No. 5,430,891, issued Aug. 23, 1994 to Nippon Paint Co., Ltd. discloses processes for continuous emulsion polymerization in which a solution containing the polymerizable material is fed to the annular space between coaxial relatively rotatable cylinders.

U.S. Pat. Nos. 5,279,463, issued Jan 18, 1994, and U.S. Pat. No. 5,538,191, issued Jul. 23, 1996, both having the same applicant as the present invention, disclose methods and apparatus for high-shear material treatment, one type of the apparatus consisting of a rotor rotating within a stator to provide an annular flow passage.

It is known in the art to process substances in the form of liquids, solids, gasses, or various combinations of the three by applying energy in the form of, for example, heat, visible, ultraviolet, or infrared light as well as longitudinal pressure oscillations, microwave, X-ray or gamma irradiations. It is common to use radiation to increase reaction rates or sterilize substances for human consumption, for example.

Microwaves cause heating by two principal methods: dipolar polarization and conduction. As the microwave frequency increases, for example from about 2.5 GHz found in a typical household microwave oven, to perhaps 20 GHz, the microwave effects increase due to higher efficiency of absorption. However, the penetration depth of the radiation decreases as the frequency increases. Water in an open container, which is transparent to microwave radiation, will boil in a standard 2.5 GHz microwave oven in approximately 3 minutes. At 20 GHz, the water would theoretically boil in 2 to 3 seconds. However, at this high frequency, the penetration depth of the microwaves is very small, perhaps to the order of $1/8$ of an inch. The interior bulk of the solution is untreated. In household applications, the frequency chosen for microwave ovens is about 2.5 GHz, which provides for a limited efficiency of absorption. A higher frequency would increase absorption, and thereby heating, but the penetration depth would decrease. The outer portions of the materials would become very hot, but the interior volume would be poorly heated. In other words, the lower frequencies promote more even heating throughout the volume, but the temperature rise is at a relatively slow rate.

Microwave radiation can increase reaction rates several hundred fold when applied to certain chemical processes. Typically, the substances are placed into reactor vessels, which are then placed inside microwave ovens operating at preselected wavelengths or frequencies. As the microwave radiation enters the materials inside the reactor, pressure and heat increase and the chemical reaction is enhanced. The processing takes place in relatively small batches, and as such is not feasible for production of industrial quantities of processed materials. There have been no practical microwave-assisted reactor that can produce relatively large quantities of materials in a continuous process.

In processing industrial quantities of chemical reactants, it would be preferable to apply high frequency electromagnetic radiation throughout the entire volume at essentially the same time, rather than just up to the penetration depth of the radiation. This would reduce the possibility of non-homogeneous reactions resulting in the production of undesirable by-products or results caused by uneven heating and mixing.

It is also known to use ultraviolet light to sterilize substances for human consumption. In one system, ultraviolet emitting tubes are placed in a tank of water contaminated with pathogens such as viruses or bacteria. The distances between the tubes is calculated so that any pathogen in the tank will be close enough to the tubes to receive a lethal dose of radiation. However, the tubes quickly become covered in slime or other contaminates, reducing the emitted ultraviolet radiation to a level where some pathogens can survive, leading to possible illness or death when the water is consumed.

It would be desirable to provide a method and apparatus for irradiating relatively large quantities of materials quickly and thoroughly.

SUMMARY OF THE INVENTION

Accordingly, an object of the present invention is to provide a method and apparatus for irradiating relatively large quantities of materials quickly and thoroughly. The invention is concerned especially, but not exclusively, with processes and apparatus that modify materials or compounds in solution or suspension.

The material is mixed and a chemical or biological reaction is controlled by the introduction or removal of energy in any form, including energy in the form of heat, visible, ultraviolet, or infrared light as well as longitudinal pressure oscillations, microwave, X-ray and gamma irradiations. The energy can be any frequency of electromagnetic-wave irradiation.

The method for processing materials of the present invention can include: passing materials to be processed in a flow path through an annular processing passage between two closely spaced smooth surfaces provided by respective inner and outer cylindrical apparatus members at least one rotating relative to the another; and irradiating the materials in the processing passage with processing energy through a wall of one of the two members. The energy applied to the processing passage can be, for example, electromagnetic energy of microwave frequency, light, X-rays, gamma radiation and ultrasonic longitudinal vibrations. The cylindrical apparatus members can rotate relative to one another about respective longitudinal axes that are coaxial with one another so that the radial spacing of the two surfaces is constant circumferentially thereof. The apparatus members can be moved so as to produce a linear velocity between their operative surfaces relative to one another of at least 0.5 meter per second. One or both of the surfaces can be coated with catalytic material that enhances at least one of chemical, biochemical and biocidal reactions in the processing passage. The cylindrical apparatus members rotate relative to one another about respective horizontally or vertically oriented parallel longitudinal axes. The outer member remains substantially stationary while the inner member rotates to produce a linear velocity between their operative surfaces relative to one another. The processing energy irradiating the materials in the processing passage can pass through the wall of the outer member and can enter the processing passage through at least one window in the wall of the outer member. The processing energy can be electromagnetic energy produced by at least one microwave tube connected to at least one port in the wall of the outer member leading to the at least one window in the wall of the outer member. The frequency of the electromagnetic energy can encompass the entire spectrum of electromagnetic waves including the spectrum between 2.5 GHz and 50 GHz. The processing energy can also be light irradiation introduced into the annular processing passage through at least one laser light guide. The processing energy can be produced by at least one transducer. The relative rotation produces eddies in the materials to be processed. The height of the annular processing passage can be less than the penetration depth of the electromagnetic energy into the materials to be processed. The invention can include producing eddies in the materials to circulate the molecules of the materials to be processed past at least one window to provide substantially even exposure on a molecular level of the materials to be processed. The material to be processed can be substantially opaque to the processing energy and the eddies can circulate the materials to be processed past the processing energy to provide surface renewal so that the molecules of the materials to be processed are substantially evenly exposed to the processing energy. The materials to be processed can include a combination of a gas and a liquid; a liquid and a solid; or a gas, liquid and solid, for example. The height of the annular processing passage can be small enough and the cylindrical apparatus members can rotate relative to each other rapidly enough so that the gas is emulsified into the liquid to produce a gas/liquid emulsification, thereby increasing the interfacial contact between the gas and liquid. Also, the height of the annular processing passage can be small enough, the cylindrical apparatus members can rotate relative to each other rapidly enough and the two closely spaced smooth surfaces can be smooth enough so that the materials to processed are essentially free of Taylor vortices. The materials to processed can then be irradiated to facilitate a reaction in the essentially Taylor vortices-free material.

The apparatus for processing materials of the present invention can include two cylindrical apparatus members mounted for rotation relative to one another, and defining two closely spaced smooth surfaces providing an annular processing passage constituting a flow path for the material, and an energy source for applying processing energy to the processing passage through a wall of the two members. The energy applied to the processing passage can be, for example, any one of electromagnetic energy of microwave frequency, light, X-rays, gamma radiation and ultrasonic longitudinal vibrations. The cylindrical apparatus members can be mounted to rotate relative to one another about respective longitudinal axes that are coaxial with one another so that the radial spacing of the two surfaces is constant circumferentially thereof. The apparatus members can be moved so as to produce a linear velocity between their operative surfaces relative to one another of at least 0.5 meter per second. One or both of the surfaces can be coated with catalytic material that enhances at least one of chemical, biochemical and biocidal reactions in the processing passage. The cylindrical apparatus members can rotate relative to one another about respective horizontally or vertically oriented parallel longitudinal axes. The outer member can remain substantially stationary while the inner member rotates to produce a linear velocity between their operative surfaces relative to one another. The processing energy can irradiate the materials in the processing passage passes through the wall of the outer member. There can be at least one window in the wall of the outer member through which the processing energy enters the processing passage and irradiates the materials. The processing energy can be electromagnetic energy produced by at least one microwave tube connected to at least one port in the wall of the outer member leading to the at least one window in the wall of the outer member. The frequency of the electromagnetic energy can encompass the entire spectrum of electromagnetic waves including the spectrum between 2.5 GHz and 50 GHz. The processing energy an be light irradiation introduced into the annular processing passage through at least one laser light guide. At least one transducer can produce the processing energy. The relative rotation can produce eddies in the materials to be processed. The height of the annular processing passage can be less than the penetration depth of the electromagnetic energy into the materials to be processed. Eddies can be produced in the materials for circulating the molecules of the materials to be processed past at least one window to provide substantially even exposure on a molecular level of the materials to be processed. The material to be processed can be substantially opaque to the processing energy. Eddies can be produced in the materials for circulating the materials to be processed past the processing energy to provide surface renewal so that the molecules of the materials to be processed are substantially evenly exposed to the processing energy. The materials to be processed can include a gas and a liquid, the height of the annular processing passage can be small enough and the cylindrical apparatus members can rotate relative to each other rapidly enough so that the gas is emulsified into the liquid to produce a gas/liquid emulsification, thereby increasing the interfacial contact between the gas and liquid; and the gas/liquid emulsification can be irradiated with the processing energy through a wall of one of the two members to facilitate a reaction between the gas and liquid. The height of the annular processing passage can be small enough, the cylindrical apparatus members can rotate relative to each other rapidly enough and the two closely spaced smooth surfaces can be smooth enough so that the materials to processed are essentially free of Taylor vortices; and the materials to be processed can be irradiated with the processing energy through a wall of one of the two members to facilitate a reaction in the essentially Taylor vortices-free material.

DETAILED DESCRIPTION OF PREFERRED EMBODIMENTS OF THE INVENTION

Figure 1:
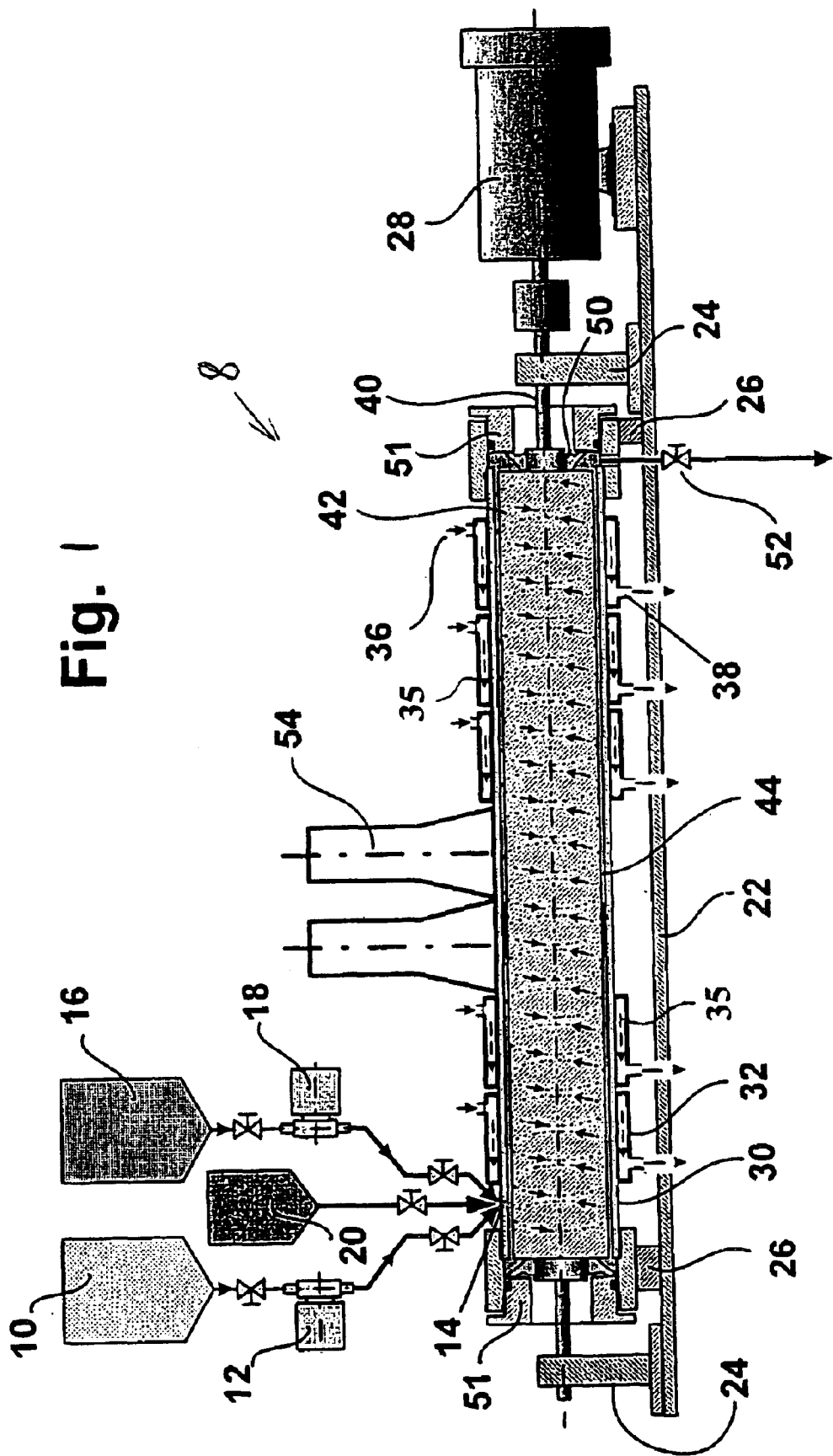
FIG. 1 is a part elevation, part longitudinal cross section through a complete material processing system showing how external energy is applied to the system to enhance and/or facilitate the processing.
Figure 2:
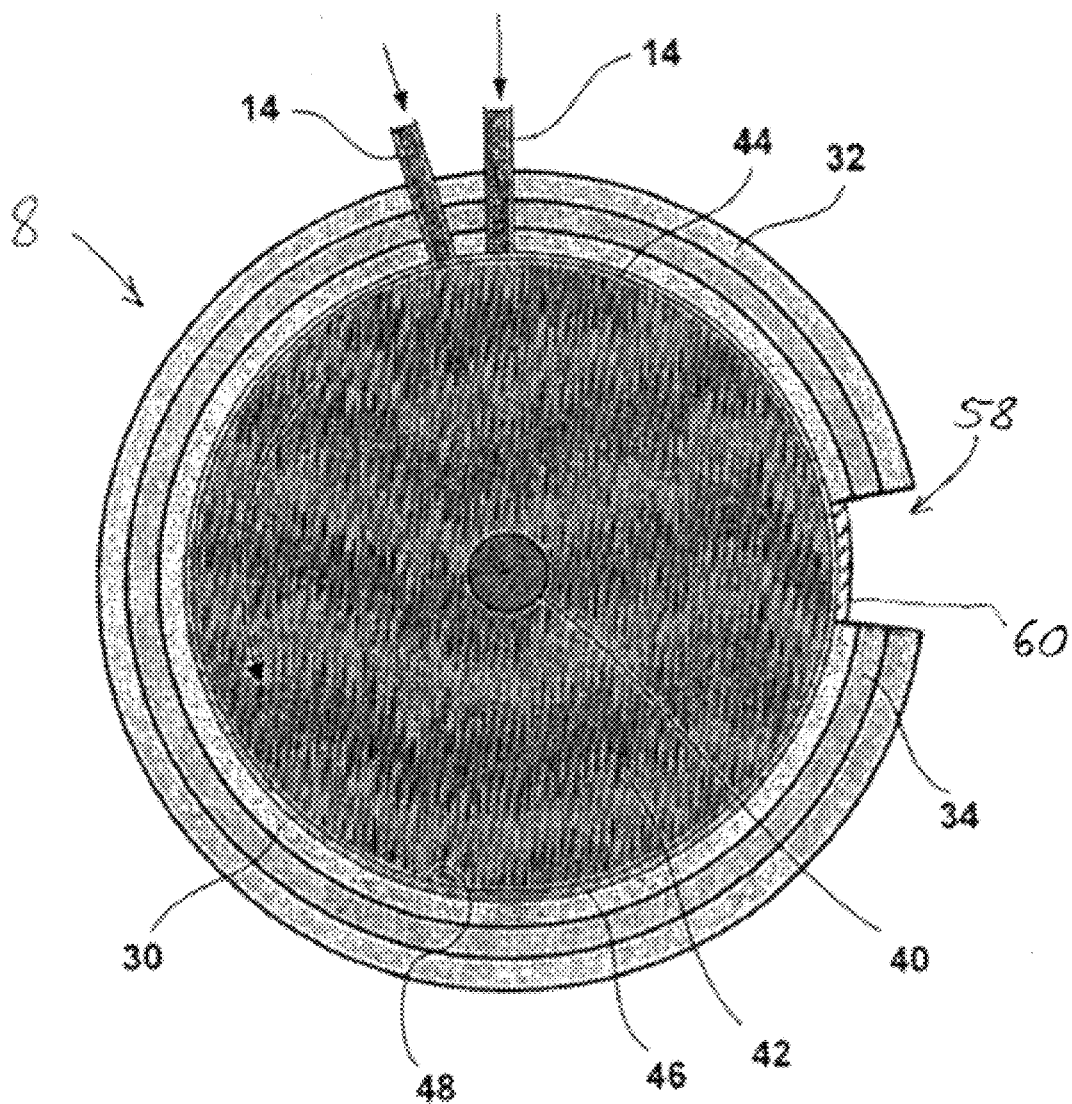
FIG. 2 is a transverse cross section through processing apparatus as shown in FIG. 1 to show the cylindrical members and their relation to one another and showing a port leading to a window in the outer cylindrical member.

In a reactor 8 illustrated by FIGS. 1 and 2, a first reactant (Reactant A) is fed from a supply tank 10 via a metering pump 12 to inlet 14, while a second reactant (Reactant B) is fed from a supply tank 16 via a metering pump 18 to the same inlet 14. If required, an optional catalyst or reactant gas is fed from a supply tank 20 to the inlet 14. If separate inlets 14 are used then they must be in close tangential proximity to one another. The processing apparatus comprises a baseplate 22 on which is mounted rotor bearing supports 24, stator supports 26 and a variable speed electric drive motor 28. An outer cylindrical apparatus member or cylindrical tube 30 comprising the apparatus stator is mounted on supports 24, and in turn supports along the major portion of its length another cylindrical tube 32 constituting the outer casing of a heat exchanger through which gas or liquid can be passed to control the temperature in the processing chamber. The annular passage 34 between the cylinders 30 and 32 can be filled with a suitable heat exchange medium such as wire mesh or the special heat exchange structures that are known by the trademark "SphereMatrix", the coolant (or heating fluid if appropriate) entering through inlets 36 and discharging through exits 38. A rotor shaft 40 extends between the supports 24 and is supported thereby, one end of the shaft being connected to the motor 28. The shaft carries a cylindrical rotor or inner cylindrical apparatus member 42, which in this embodiment is solid and has its axis of rotation coincident with the longitudinal axis of the stator cylinder 30. An annular gap or annular cross section processing chamber 44 is formed between the inner cylindrical surface 46 of stator 30 and outer cylindrical surface 46 of rotor 42 and face body 51; the ends of the chamber are closed against leakage by end seals 50 that surround the shaft 40. The reacted material is discharged through an outlet 52. The reactants and resultant mixture in the processing chamber 44 can be liquids, solids, gasses, or various combinations of the three.

Rather than the horizontal orientation of FIG. 1, the reactor can be configured vertically with the outlet 52 at the top. Other orientations can be used as well. Also, the cooperating surfaces 46 and 48 in FIG. 2 can be coated with a catalyst to facilitate a chemical or biological reaction that constitutes the processing step. The catalytic material can enhance chemical, biochemical or biocidal reactions in the processing passage.

Mixing of the reactants is achieved by the rotation of the rotor 42 relative to the stator cylinder 30. Rather than the central body being the rotor 42, although this is mechanically the most convenient construction, the exterior cylindrical member, or both the central and exterior members can be rotated. At least a minimum peripheral velocity is produced between the rotor and the stator in order to create eddies for mixing and surface renewal. In the presently depicted preferred embodiment, this differential, tangential velocity should not be less than 0.5 meters per second, preferably above 2.0 m per second.

Energy is supplied to the reactants by a number of transducers 54, for example electromagnetic radiation or longitudinal pressure generating sources, which are provided along the length of the stator cylinder 30. The transducers can be, for example magnetrons or klystrons, which produce very short wavelength (e.g. 2 mm–50 cm) electromagnetic radiation. Another choice is that they can be light sources of whatever wavelength (color) is appropriate for the process, X-ray sources, gamma ray sources, or they can be transducers producing longitudinal oscillations, usually of ultrasonic frequencies. In fact, electromagnetic waves throughout the entire spectrum may be introduced in order to assist the chemical or biological reactions. For example, light may be introduced utilizing laser light guides ranging from infrared to ultraviolet wavelengths. As another example, microwave radiation may be introduced into the reactor annular chamber 44 utilizing wave-guides located around the periphery of the reactor vessel. The microwave frequency could be, for example, between 2.5 GHz through 50 GHz.

As illustrated more clearly in FIG. 2, the electromagnetic radiation can enter the annular chamber 44 through a port 58. The radiation passes through a window 60 which provides a seal between the annular chamber 44 and the port 58. Of course more than one window 60 can be used depending on the irradiation requirements of the given material. The window 60 can be part of the stator cylinder 30 or can be separate. When there is no separate window, the material from which the stator is made, or at least the portion thereof between the transducers and the annular chamber 44, is as transparent as possible to the energy. The material thickness and other characteristics of the window 60 are chosen based on some of the same criteria used in the design of the stator cylinder 30, for example, criteria based on durability and performance when exposed to the materials processed in the annular chamber 44 under the applied forces. The window 60 should also be made of a material and have a thickness suitable to pass the desired type of radiation into the annular chamber 44. For example, when microwaves are used, a glass, quartz or Teflon window 60 can be used. The window 60 should have a thickness of an odd number multiple of ¼ wavelength and a low dielectric loss property to maximize transmission from the window into the annular chamber 44. The size and shape of the window 60 can vary depending on the application. When light is used, the window 60 can be clear glass, for example. When the transducers 54 produce longitudinal pressure oscillations, the window 60 can be a diaphragm for passing the oscillations into the annular chamber 44.

The microwaves can be applied to the material within the annular chamber 44 of the reactor 8 to achieve continuous chemical reactions assisted by the electromagnetic radiation. The present invention solves the problem of irradiating relatively large quantities of reactants quickly, evenly and thoroughly. The height of the annular chamber 44 is much narrower than the penetration depth of high frequency microwaves into the reactant material. Therefore, the heating throughout the thin layer of the reactant material is extremely even and rapid. The chemical reaction proceeds across the entire thickness essentially simultaneously, providing heating in many cases several hundred times faster than in conventional reactors. Additionally, the rotation of the rotor 42 relative to the stator 30 sets up eddies which circulate reactants from near the rotor 42 to near the stator 30 and back again. These micro-eddies circulate the reactants very rapidly so that a given molecule in the material can pass by the window 60 many thousands of times as the material flows through the reactor 8 from the inlet 14 to the outlet 52. This circulation provides substantially uniform exposure of the reactants to the microwaves since the reactants will be exposed to substantially the same maximum and average values of irradiation on the molecular level.

The reactor 8 can also be used to sterilize substances such as water by destroying pathogens such as viruses or bacteria to make the substances safe for human consumption. Various types of radiation can be used to directly destroy the pathogens upon exposure. Alternatively, the radiation can be used to indirectly destroy the pathogens. For example, titanium dioxide particles, can be suspended as a catalyst in water needing to be sterilized. Ultraviolet light is then radiated into the annular chamber 44 through the window 60. The titanium dioxide particles release ozone when exposed to the ultraviolet light, which can kill the pathogens.

The reactor 8 is very useful for sterilizing even highly opaque materials, for example, milk. Light radiation can not penetrate very far into opaque materials. However, in the present invention the rapid rotation of the rotor 42 relative to the stator 30 and the shallow depth of the annular chamber 44 sets up eddies which rapidly circulate reactants from near the rotor 42 to near the stator 30 and back again. This circulation provides surface renewal and assures that practically every pathogen will pass by the inner surface of the window 60 to be destroyed by the irradiation. The flow rate of the material through the reactor 8 can be adjusted by adjusting the strength of the pumping between the inlet 14 and the outlet 52. Slower pumping will allow each pathogen to spend more time near the window 60 to receive greater exposure to the irradiation. An embodiment of the present invention having a length of 30 inches long and a 3 inch diameter rotor 42 can have a flow rate of 1–2 gallons per minute. Of course the flow rate is variable and the reactor 8 is scalable to various sizes and proportions. Also, rotating the rotor 42 and stator 30 more quickly can set up more rapid eddies to circulate the pathogens past the window 60 more times. An embodiment of the present invention using a three inch diameter rotor 42 can have a typical rate of rotation of 3,000 rpm.

The smallest of the eddies should have a diameter at least as large as the height of the processing chamber 44. In this way the molecules forming the reactants are circulated very rapidly between the surfaces 46 and 48. This assures that molecules near the surface 48 will be circulated to a position near the surface 46 and the window 60 for exposure to the radiation entering through the window 60. This surface renewal assures even and through exposure of the reactants to the radiation, even if the radiation can not penetrate very far into the processing chamber due to the opaqueness or limited penetration depth of the reactants. Further, the eddies assure rapid and thorough mixing of the reactants. The height of the processing chamber and relative rate of rotation of the rotor 42 and stator 30 are optimized to assure proper eddy size. If the height of the processing chamber 44 were two eddy diameters, for example, many of the molecules would only travel from near the surface 48 to the center of the processing chamber 44 and would not make it close enough to the window 60 for adequate surface renewal.

Importantly, the reactor 8 can be quickly and thoroughly cleaned. Therefore, unlike the prior art, deposits forming and blocking the irradiation is not a problem. For example, even if the reactant is a sticky opaque substance, the window 60 is easily cleaned. By running the reactor 8 with clean water for enough time for the water to pass from the inlet 14 to the outlet 52, substances clinging to the window 60 are washed away. In most cases the surfaces of the annular chamber 44 are clean within five seconds. This efficient cleaning ability is due to the extremely hard sheer forces as the rotor 42 and stator 30 rotate relative to each other. In most cases, no contaminants will even form on the window 60 or walls of the annular chamber 44 due to the hard sheer forces pulling the materials through the reactor 8. The reactor 8 can operate either eccentrically or concentrically, provided that the annular chamber 44 between the stationary and rotating cylinders is less than the penetration depth of the electromagnetic radiation being applied. Furthermore, the annular chamber 44 can be narrow enough to prevent turbulent flow of the reactants, in accordance with the disclosure of U.S. Pat. No. 5,538,191 published on Jul. 23, 1996.

U.S. Provisional Application No. 60/214,538 to Holl filed on Jun. 27, 2000 describes the use of the reactor 8 for gas/liquid reaction. The reactor emulsifies the gas into the liquid providing increased contact between the liquid and gas for more efficient reactions. The gas is emulsified by making the annular chamber 44 narrow enough and by rotating the rotor 42 fast enough relative to the stator 30. It provides a much better reaction than does sparging gasses through liquids. U.S. Provisional Application No. 60/214,538 is incorporated by reference into the present disclosure. The present invention can be used to provide electromagnetic or longitudinal pressure energy to the emulsified gas to enhance the gas/liquid reaction. The gas/liquid reaction can be used in an oxygenation process, or an enzyme reaction process for example. Additionally, solids, such as catalytic powders, can be added to the annular chamber 44 to form a gas/liquid/solid emulsion to provide a gas/liquid/solid reaction which can also be enhanced by the applied electromagnetic or longitudinal pressure energy.

Figure 3:
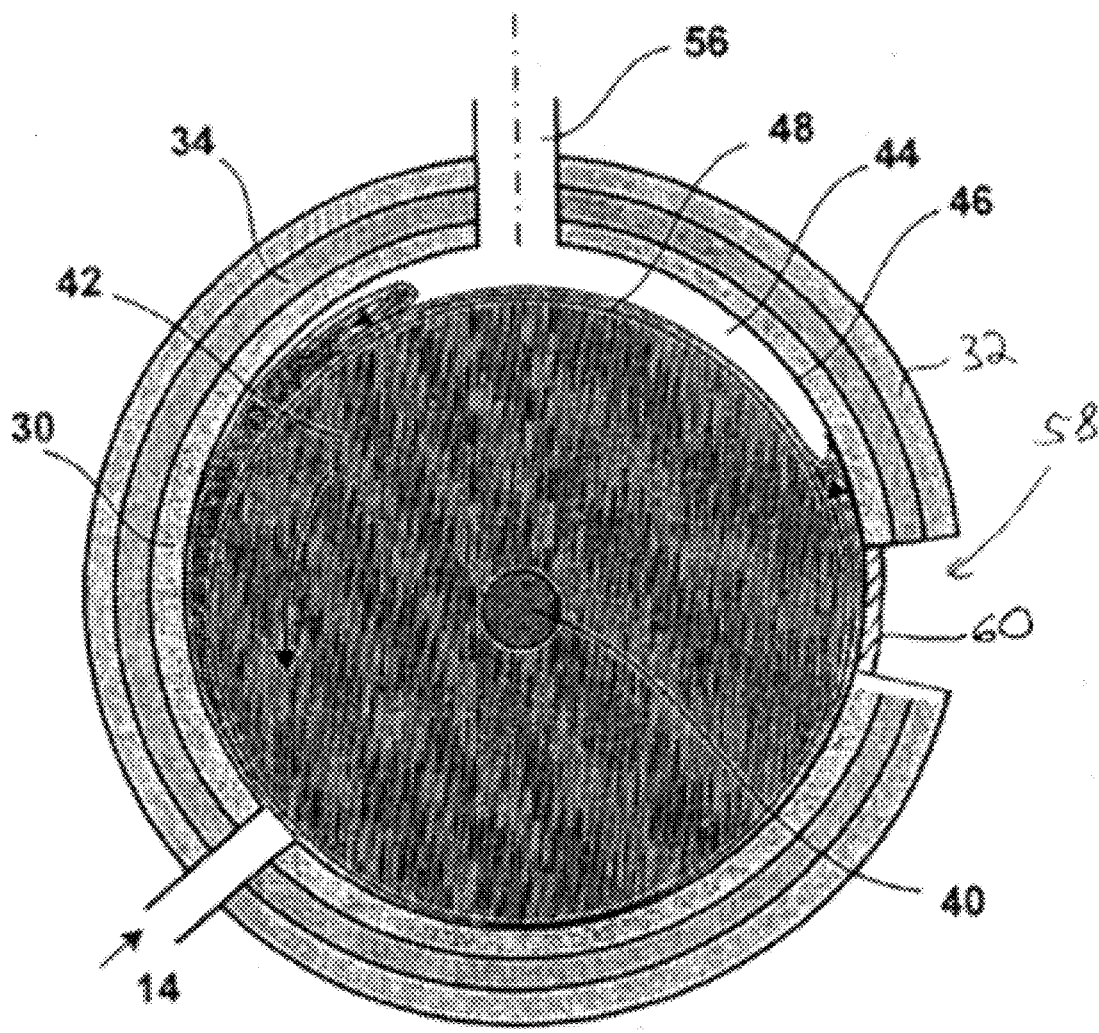
FIG. 3 is a cross section similar to FIG. 3 though the apparatus in which the longitudinal axes of the stator and rotor are displaced to give an annular passage that varies in radial width around its circumference.

The embodiment of FIG. 3 is intended for an enzyme reaction process, and the axis of rotation of the rotor 42 is no longer coincident with the corresponding longitudinal axis of the stator 30, so that the radial processing chamber gap 44 differs in dimension circumferentially around the rotor. Energy is radiated into the chamber 44 to aid the enzyme reaction process. A heat exchange structure is provided having an outer casing 32 and heat exchange material 35, since such processes usually are exothermic and surplus heat must be removed for optimum operative conditions for the microorganisms. A series of oxygen feed inlets 14 are arranged along the length of the stator and the oxygen fed therein is promptly emulsified into the broth, providing uniformly dispersed, micron-fine bubbles instead of being sparged therein with mm size bubbles of non-uniform distribution, as with conventional enzyme reaction systems. The carbon dioxide that is produced is vented from the upper part of the processing passage through a vent 56. The reactor according to FIG. 3 is designed to operate continuously and provides a continuous and uniform CO2 removal along the upper portion of the rotor which is constantly wetted with a film of broth of uniform mixedness of all ingredients. Also shown is the port 58 and window 60 as described with reference to FIG. 2. The port and window are used to supply microwave or light radiation to facilitate the enzyme reaction process.

U.S. patent application Ser. No. 09/802,037 to Holl filed on Mar. 7, 2001 describes the elimination of Taylor vortices by meeting the three requirements of: 1) smooth annular chamber surfaces, 2) thin annular chamber height and 3) rapid rotor rotation. The elimination of Taylor vortices provides greatly improved mixing. U.S. patent application Ser. No. 09/802,037 is incorporated by reference into the present disclosure. The present invention can be used to provide electromagnetic or longitudinal pressure energy to the Taylor-vortices free material in the annular chamber to combine the reaction enhancements of thorough mixing along with irradiation.

The reactor 8 and its modes of operation are described in greater detail in U.S. Pat. No. 5,538,191 published on Jul. 23, 1996 which includes Richard A. Holl as an inventor. U.S. Pat. No. 5,538,191 is incorporated by reference into the present disclosure.

The apparatus of the invention is generically a reactor process and apparatus, and a reactor consists of the vessels used to produce desired products by physical or chemical means, and is frequently the heart of a commercial processing plant. Its configurations, operating characteristics, and underlying engineering principles constitute reactor technology. Besides stoichiometry and kinetics, reactor technology includes requirements for introducing and removing reactants and products, supplying and withdrawing heat, accommodating phase changes and material transfers, assuring efficient contacting among reactants, and providing for catalyst replenishment or regeneration. These issues are taken into account when one translates reaction kinetics and bench-scale data into the design and manufacture of effective pilot plants, and thereafter scale up such plants to larger sized units, and ultimately designs and operates commercial plants.

While the specification describes particular embodiments of the present invention, those of ordinary skill can devise variations of the present invention without departing from the inventive concept.

I claim:

1. A method for processing materials, comprising:
    passing materials to be processed in a flow path through an annular processing passage between two closely-spaced smooth surfaces provided by respective inner and outer cylindrical apparatus members at least one rotating relative to the another, the height of the annular processing passage is small enough, the cylindrical apparatus members rotate relative to each other rapidly enough and the two closely-spaced smooth surfaces are smooth enough such that the materials are essentially free of Taylor vortices; and
    irradiating the materials in the processing passage with processing energy passing through at least one window of one of the two members, wherein the height of the annular processing passage is less than the penetration depth of the processing energy into the materials to be processed.

2. A method as claimed in claim 1, wherein the energy applied to the processing passage is any one of electromagnetic energy of microwave frequency, light, X-rays, gamma radiation and ultrasonic longitudinal vibrations.

3. A method as claimed in claim 1, wherein the cylindrical apparatus members rotate relative to one another about respective longitudinal axes that are coaxial with one another so that the radial spacing of the two surfaces is constant circumferentially thereof.

4. A method as claimed in claim 1, wherein the apparatus members are moved so as to produce a linear velocity between their operative surfaces relative to one another of at least 0.5 meter per second.

5. A method as claimed in claim 1, wherein one or both of the surfaces is coated with catalytic material that enhances at least one of chemical, bio-chemical and biocidal reactions in the processing passage.

6. A method as claimed in claim 1, wherein the cylindrical apparatus members rotate relative to one another about respective horizontally oriented parallel longitudinal axes.

7. A method as claimed in claim 1, wherein the cylindrical apparatus members rotate relative to one another about respective vertically oriented parallel longitudinal axes.

8. A method as claimed in claim 1, wherein the outer member remains substantially stationary while the inner member rotates to produce a linear velocity between their operative surfaces relative to one another.

9. A method as claimed in claim 8, wherein the processing energy irradiating the materials enters the processing passage through at least one window in the wall of the outer member.

10. A method as claimed in claim 9, wherein the processing energy is electromagnetic energy produced by at least one microwave tube connected to at least one port in the wall of the outer member leading to the at least one window in the wall of the outer member.

11. A method as claimed in claim 10, wherein the frequency of the electromagnetic energy is between 2.5 GHz and 50 GHz.

12. A method as claimed in claim 8, wherein the processing energy is light irradiation introduced into the annular processing passage through at least one laser light guide.

13. A method as claimed in claim 1, wherein the processing energy is produced by at least one transducer.

14. A method as claimed in claim 1, wherein the processing energy is electromagnetic energy.

15. A method as claimed in claim 14, wherein the frequency of the electromagnetic energy is between 2.5 GHz and 50 GHz and the electromagnetic energy enters the processing passage through at least one window in the wall of the outer member; and further including:
    circulating the molecules of the materials to be processed past the at least one window to provide substantially even exposure on a molecular level of the materials to be processed.

16. A method as claimed in claim 1, wherein the material to be processed is substantially opaque to the processing energy and further comprising the step of circulating the materials to be processed past the processing energy to provide surface renewal so that molecules of the materials to be processed are substantially evenly exposed to processing energy.

17. A method as claimed in claim 1, wherein:
    the materials to be processed include a gas and a liquid;
    the height of the annular processing passage is small enough and the cylindrical apparatus members rotate relative to each other rapidly enough so that the gas is emulsified into the liquid to produce a gas/liquid emulsification, thereby increasing the interfacial contact between the gas and liquid; and
    the gas/liquid emulsification is irradiated with the processing energy through said at least one window of the two members to facilitate a reaction between the gas and liquid.

18. A method as claimed in claim 1, further including
    irradiating the materials to be processed with the processing energy through at least one window of the two members to facilitate a reaction in the essentially Taylor vortices-free material.

19. An apparatus for processing material comprising:
    two cylindrical apparatus members being mounted concentrically about a common axis for rotation relative to one another, and defining two closely-spaced smooth surfaces providing an annular processing passage constituting a flow path for the material, the height of the annular processing passage is small enough, the cylindrical apparatus members rotate relative to each other rapidly enough and the two closely-spaced smooth surfaces are smooth enough so that the materials to processed are essentially free of Taylor vortices; and an energy source for applying processing energy to the processing passage through at least one window in at least one wall of the two members, wherein the height of the annular processing passage is less than the penetration depth of said processing energy.

20. An apparatus as claimed in claim 19, wherein the energy applied to the processing passage is any one of electromagnetic energy of microwave frequency, light, X-rays, gamma radiation and ultrasonic longitudinal vibrations.

21. An apparatus as claimed in claim 19, wherein the cylindrical apparatus members are mounted to rotate relative to one another about respective longitudinal axes that are coaxial with one another so that the radial spacing of the two surfaces is constant circumferentially thereof.

22. An apparatus as claimed in claim 19, wherein the apparatus members are moved so as to produce a linear velocity between their operative surfaces relative to one another of at least 0.5 meter per second.

23. An apparatus as claimed in claim 19, wherein one or both of the surfaces is coated with catalytic material that enhances at least one of chemical, bio-chemical and biocidal reactions in the processing passage.

24. An apparatus as claimed in claim 19, wherein the cylindrical apparatus members rotate relative to one another about respective horizontally oriented parallel longitudinal axes.

25. An apparatus as claimed in claim 19, wherein the cylindrical apparatus members rotate relative to one another about respective vertically oriented parallel longitudinal axes.

26. An apparatus as claimed in claim 19, wherein the outer member remains substantially stationary while the inner member rotates to produce a linear velocity between their operative surfaces relative to one another.

27. An apparatus as claimed in claim 26, wherein the processing energy irradiating the materials in the processing passage passes through the wall of the outer member.

28. An apparatus as claimed in claim 26, wherein the processing energy is light irradiation introduced into the annular processing passage through at least one laser light guide.

29. An apparatus as claimed in claim 19, wherein the processing energy is electromagnetic energy produced by at least one microwave tube connected to at least one port in the wall of the outer member leading to the at least one window in the wall of the outer member.

30. An apparatus as claimed in claim 29, wherein the frequency of the electromagnetic energy is between 2.5 GHz and 50 GHz.

31. An apparatus as claimed in claim 19, further comprising at least one transducer for producing the processing energy.

32. An apparatus as claimed in claim 19, wherein the processing energy is electromagnetic energy.

33. An apparatus as claimed in claim 32, wherein the frequency of the electromagnetic energy is between 2.5 GHz and 50 GHz; wherein said at least one window is in the wall of the outer member through which the electromagnetic energy enters the processing passage; and molecules of the materials to be processed, pass the at least one window, to provide substantially even exposure on a molecular level of the materials to be processed.

34. An apparatus as claimed in claim 33, wherein the material to be processed is substantially opaque to the processing energy.

35. An apparatus as claimed in claim 19, wherein:

the materials to be processed include a gas and a liquid;

the height of the annular processing passage is small enough and the cylindrical apparatus members rotate relative to each other rapidly enough so that the gas is emulsified into the liquid to produce a gas/liquid emulsification, thereby increasing the interfacial contact between the gas and liquid; and the gas/liquid emulsification is irradiated with the processing energy through said at least one window of one of the two members to facilitate a reaction between the gas and liquid.

36. A method as claimed in claim 19, wherein:

the materials to be processed are irradiated with the processing energy through said at least one window of one of the two members to facilitate a reaction in the essentially Taylor vortices-free material.

37. A means for electromagnetic processing of material comprising:

two cylindrical apparatus members mounted for rotation relative to one another, and defining two closely-spaced smooth surfaces, the height of the annular processing passage is small enough, the cylindrical apparatus members rotate relative to each other rapidly enough and the two closely-spaced smooth surfaces are smooth enough providing an annular processing passage constituting a flow path for essentially Taylor vortex-free mixing the material; and a means for supplying electromagnetic energy to the material through at least one window in a wall of the two members.

* * * * *

UNITED STATES PATENT AND TRADEMARK OFFICE
CERTIFICATE OF CORRECTION

PATENT NO. : 6,723,999 B2
DATED : April 20, 2004
INVENTOR(S) : Richard A. Holl

It is certified that error appears in the above-identified patent and that said Letters Patent is hereby corrected as shown below:

Column 1,
Line 32, replace "5,430,891" with -- 5,340,891 --.

Signed and Sealed this

Thirtieth Day of November, 2004

JON W. DUDAS
*Director of the United States Patent and Trademark Office*